(12) United States Patent
Liu et al.

(10) Patent No.: US 10,339,284 B2
(45) Date of Patent: Jul. 2, 2019

(54) MEASUREMENT METHOD, ELECTRONIC DEVICE, AND MEASUREMENT SYSTEM

(71) Applicant: Huawei Technologies Co., Ltd., Shenzhen (CN)

(72) Inventors: Jianfeng Liu, Beijing (CN); Xun Shi, Shenzhen (CN); Huanguo Zhang, Wuhan (CN); Fei Yan, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 209 days.

(21) Appl. No.: 15/071,430

(22) Filed: Mar. 16, 2016

(65) Prior Publication Data

US 2016/0196415 A1     Jul. 7, 2016

Related U.S. Application Data

(63) Continuation of application No. PCT/CN2014/084478, filed on Aug. 15, 2014.

(30) Foreign Application Priority Data

Sep. 16, 2013 (CN) .......................... 2013 1 0422976

(51) Int. Cl.
G06F 21/30 (2013.01)
G06F 21/57 (2013.01)
G06F 9/455 (2018.01)

(52) U.S. Cl.
CPC .......... *G06F 21/30* (2013.01); *G06F 9/45558* (2013.01); *G06F 21/57* (2013.01);
(Continued)

(58) Field of Classification Search
CPC .. G06F 9/45558; G06F 9/45533; G06F 21/53; G06F 21/57; G06F 21/566;
(Continued)

(56) References Cited

U.S. PATENT DOCUMENTS 7,418,584 B1 * 8/2008 Klaiber ............... G06F 9/45533
    712/229
9,087,196 B2 * 7/2015 Wood ..................... G06F 21/57
(Continued)

FOREIGN PATENT DOCUMENTS

CN     1987886 A    6/2007
CN     1991779 A    7/2007
(Continued)

OTHER PUBLICATIONS

Foreign Communication From a Counterpart Application, European Application No. 14844140.5, Extended European Search Report dated Jul. 29, 2016, 9 pages.
(Continued)

*Primary Examiner* — Tae K Kim
(74) *Attorney, Agent, or Firm* — Conley Rose, P.C.

(57) ABSTRACT

A measurement method, an electronic device, and a measurement system where the electronic device reads, from a hardware storage device, running code and running data that are in a running process of a virtual machine manager (VMM), and generates first verification information according to the running code and the running data, and the electronic device stores the first verification information, and transmits, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

12 Claims, 4 Drawing Sheets

---

An electronic device reads, from a hardware storage device, running code and running data that are in a running process of a virtual machine manager VMM, and generates first verification information according to the running code and the running data  ⎯101

The electronic device stores the first verification information, and transmits, to a trusted data center, log information generated in a process that is from reading, by the electronic device, the running code and the running data to storing, by the electronic device, the first verification information, so that the trusted data center measures the electronic device by using the first verification information acquired from the electronic device and second verification information generated according to the log information  ⎯102

(52) U.S. Cl.
CPC ............ *G06F 2009/45587* (2013.01); *G06F 2221/034* (2013.01); *G06F 2221/2101* (2013.01)

(58) Field of Classification Search
CPC ....... G06F 2009/45587; G06F 11/3476; G06F 9/455; G06F 2009/45595; G06F 2009/45591
See application file for complete search history.

(56) References Cited

U.S. PATENT DOCUMENTS

| | | | |
|---|---|---|---|
| 9,223,962 B1* | 12/2015 | Kashyap | G06F 21/566 |
| 9,250,951 B2* | 2/2016 | Haikney | G06F 9/46 |
| 9,342,696 B2* | 5/2016 | Imtiaz | G06F 21/575 |
| 9,372,984 B2* | 6/2016 | Smith | G06F 21/00 |
| 2006/0200819 A1* | 9/2006 | Cherkasova | G06F 9/45533 718/1 |
| 2008/0209556 A1 | 8/2008 | Fu et al. | |
| 2008/0235754 A1* | 9/2008 | Wiseman | G06F 9/45533 726/1 |
| 2008/0244573 A1* | 10/2008 | Sahita | G06F 9/45558 718/1 |
| 2009/0144582 A1 | 6/2009 | Li et al. | |
| 2010/0281273 A1* | 11/2010 | Lee | G06F 21/72 713/190 |
| 2012/0131662 A1 | 5/2012 | Kuik et al. | |
| 2012/0324239 A1 | 12/2012 | Falk et al. | |
| 2013/0227296 A1 | 8/2013 | Lee et al. | |
| 2014/0208442 A1* | 7/2014 | Mooring | G06F 9/45533 726/30 |
| 2014/0282502 A1* | 9/2014 | Natu | G06F 9/45533 718/1 |
| 2015/0026687 A1* | 1/2015 | Yim | G06F 9/522 718/102 |
| 2015/0309813 A1* | 10/2015 | Patel | G06F 8/75 703/22 |
| 2016/0026490 A1* | 1/2016 | Johnsson | H04L 43/0864 718/1 |

FOREIGN PATENT DOCUMENTS

| | | |
|---|---|---|
| CN | 101043338 A | 9/2007 |
| CN | 101226569 A | 7/2008 |
| CN | 101344904 A | 1/2009 |
| CN | 102136043 A | 7/2011 |
| CN | 102479304 A | 5/2012 |
| CN | 102667803 A | 9/2012 |
| CN | 103488937 A | 1/2014 |
| WO | 2013089695 A1 | 6/2013 |

OTHER PUBLICATIONS

Barham, P., et al., "Xen and the Art of Virtualization," SOSP, Oct. 19-22, 2003, 14 pages.
"Intel 64 and IA-32 Architectures Software Developer's Manual," Combined Volumes: 1, 2A, 2B, 2C, 2D, 3A, 3B, 3C and 3D, Part 2, Jun. 2016, 2101 pages.
"Intel 64 and IA-32 Architectures Software Developer's Manual," Combined Volumes: 1, 2A, 2B, 2C, 2D, 3A, 3B, 3C and 3D, Part 1, Jun. 2016, 2517 pages.
"Tool Interface Standard (TIS) Executable and Linking Format (ELF) Specification," Version 1.2, May 1995, 106 pages.
"TPM Main, Part 1 Design Principles," Specification Version 1.2, Revision 116, Mar. 1, 2011, 184 pages.
"TPM Main, Part 2 TPM Structures," Specification Version 1.2, Level 2 Revision 116, Mar. 1, 2011, 201 pages.
"TPM Main, Part 3 Commands," Specification Version 1.2, Level 2, Revision 116, Mar. 1, 2011, 339 pages.
"Volume 4: Platform Initialization Specification, System Management Mode Core Interface," Version 1.2, May 13, 2009, 286 pages.
Petroni, N., et al., "Copilot—a Coprocessor-based Kernel Runtime Integrity Monitor," Proceedings of the 13th conference on USENIX Security Symposium—vol. 13, 2004, 16 pages.
Azab, A., et al., "HyperSentry: Enabling Stealthy In-context Measurement of Hypervisor Integrity," CCS, Oct. 4-8, 2010, 12 pages.
Partial English Translation and Abstract of Chinese Patent Application No. CN103488937, Mar. 25, 2016, 4 pages.
Partial English Translation and Abstract of Chinese Patent Application No. CN102136043, Jul. 11, 2016, 13 pages.
Partial English Translation and Abstract of Chinese Patent Application No. CN101043338, Jul. 11, 2016, 24 pages.
Foreign Communication From a Counterpart Application, Chinese Application No. 201310422976.3, Chinese Office Action dated Apr. 19, 2016, 10 pages.
Foreign Communication From a Counterpart Application, Chinese Application No. 201310422976.3, Chinese Office Action dated Sep. 11, 2015, 12 pages.
Foreign Communication From a Counterpart Application, PCT Application No. PCT/CN2014/084478, English Translation of International Search Report dated Nov. 18, 2014, 3 pages.
Foreign Communication From a Counterpart Application, PCT Application No. PCT/CN2014/084478, English Translation of Written Opinion dated Nov. 18, 2014, 12 pages.

* cited by examiner

MEASUREMENT METHOD, ELECTRONIC DEVICE, AND MEASUREMENT SYSTEM

CROSS-REFERENCE TO RELATED APPLICATIONS

This application is a continuation of International Application No. PCT/CN2014/084478, filed on Aug. 15, 2014, which claims priority to Chinese Patent Application No. 201310422976.3, filed on Sep. 16, 2013, both of which are hereby incorporated by reference in their entireties.

TECHNICAL FIELD

The present disclosure relates to the field of computer technologies, and further to a measurement method, an electronic device, and a measurement system.

BACKGROUND

The existing computer industry has entered an era of cloud computing. Using cloud computing, massive computing resources, storage resources, and software resources are linked together to form a large-scale shared virtual software resource pool for providing remote computers with software services of high-speed computing and searching.

With increasing popularization of cloud computing, access security becomes more important. Therefore, a virtual machine monitor of an accessed electronic device needs to be measured. Higher security of the virtual machine monitor indicates higher access security.

When measurement is performed on a virtual machine monitor in the prior art, measurement and verification on a measurement agent of the virtual machine monitor are implemented in a system management mode (SMM) of a central processing unit (CPU), triggering of execution of a measurement agent is shielded, and a measurement value is transmitted transparently. A specific implementation manner thereof is as follows.

First, a system management interrupt (SMI) is triggered for entering a SMM, a virtual machine exit (VM exit) instruction is forcibly inserted, and a value of a counter is set to 1. Then the SMM is exited. In this case, a CPU enters a "root" mode of a virtual machine according to the VM exit instruction, and executes the VM exit instruction, which causes the value of the counter to change from 1 to 0. Then, the SMI is triggered again for entering the SMM such that an execution environment is set for the measurement agent for masking various types of interrupts, modifying a jump table, and the like in order to determine that execution of the measurement agent is not interfered by interrupts or exceptions. After the setting of the execution environment is complete, an SMM mode is exited, and the measurement agent is invoked to measure context of the CPU and running data and code of the virtual machine monitor. After the measurement is complete, the SMI is triggered a third time, a measurement result is retained in the SMM, the measurement result is transmitted to a peripheral, modification that is made for the measurement is restored and returned to the virtual machine monitor for continuing the execution.

In the foregoing process of executing measurement, because a VM exit instruction needs to be forcibly inserted, a current execution path of the CPU is changed, which disrupts a running process of a system and reduces stability and reliability of the system. In addition, the measurement agent is in the virtual machine monitor, and therefore the measurement work can be complete only by means of support of the virtual machine monitor. When the virtual machine monitor is insecure, a measurement result obtained by executing the measurement agent may be inaccurate, resulting in lower measurement accuracy.

In conclusion, measurement performed on an existing electronic device may disrupt a running process of an operating system in the electronic device, leading to problems of low security and low measurement accuracy.

SUMMARY

Embodiments of the present application provide a measurement method, an electronic device, and a measurement system in order to resolve problems of low security and low measurement accuracy that arise because measurement performed on an existing electronic device may disrupt a running process of an operating system in the electronic device.

According to a first aspect of the present disclosure, a measurement method is provided. The method includes reading, by an electronic device from a hardware storage device, running code and running data that are in a running process of a virtual machine manager (VMM), and generating first verification information according to the running code and the running data, and storing, by the electronic device, the first verification information, and transmitting, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

With reference to the first aspect, in a first possible implementation manner, the reading, by an electronic device from a hardware storage device, running code and running data that are in a running process of a VMM further includes reading, by the electronic device from firmware complementary metal-oxide semiconductor (CMOS), storage address information and storage capacity information of the running code and the running data, and reading, by the electronic device from the hardware storage device, the running code and the running data according to the storage address information and the storage capacity information.

With reference to the first possible implementation manner of the first aspect, in a second possible implementation manner, after the reading, by the electronic device from firmware CMOS, storage address information and storage capacity information of the running code and the running data and before the reading, from the hardware storage device, the running code and the running data according to the storage address information and the storage capacity information, the method further includes verifying, by the electronic device, the storage address information and the storage capacity information.

With reference to the first possible implementation manner of the first aspect, in a third possible implementation manner, the reading, by the electronic device from a CMOS, storage address information and storage capacity information of the running code and the running data further includes reading, by the electronic device from the CMOS, the storage address information and the storage capacity information in a SMM.

With reference to the third possible implementation manner of the first aspect, in a fourth possible implementation manner, before the reading, by the electronic device from the CMOS, the storage address information and the storage capacity information in a SMM, the method further includes digitally signing, by the electronic device, the storage address information and the storage capacity information of the running code and the running data in the running process of the VMM, and writing, into the CMOS, the storage address information and the storage capacity information that are digitally signed.

With reference to the first aspect or any one of the first to the fourth possible implementation manners, in a fifth possible implementation manner, the storing, by the electronic device, the first verification information further includes, if first verification information has not been stored currently, storing, by the electronic device, the newly generated first verification information, or if first verification information has been stored currently, replacing, by the electronic device, the stored first verification information with the newly generated first verification information, or storing, by the electronic device, the newly generated first verification information and first time at which the first verification information is newly generated such that the trusted data center determines, according to second time in the log information and the first time acquired from the electronic device, first verification information used for measuring the electronic device.

With reference to the first aspect or any one of the first to the fifth possible implementation manners, in a sixth possible implementation manner, the storing, by the electronic device, the first verification information further includes storing, by the electronic device, the first verification information in a trusted platform module (TPM) chip of the electronic device.

With reference to the first aspect or any one of the first to the sixth possible implementation manners, in a seventh possible implementation manner, the generating, by the electronic device, first verification information according to the running code and the running data is further include performing, by the electronic device, hash calculation on the running code and the running data, and using a generated hash value as the first verification information.

According to a second aspect of the present disclosure, an electronic device is provided, including a data reading unit configured to read, from a hardware storage device, running code and running data that are in a running process of a VMM, a verification information generating unit configured to receive the running code and the running data that are sent by the data reading unit, and generate first verification information according to the running code and the running data, a storage unit configured to receive the first verification information sent by the verification information generating unit, and store the first verification information, and a sending unit configured to transmit, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

With reference to the second aspect, in a first possible implementation manner, the data reading unit is further configured to read storage address information and storage capacity information of the running code and the running data from firmware CMOS, and read the running code and the running data from the hardware storage device according to the storage address information and the storage capacity information.

With reference to the first possible implementation manner of the second aspect, in a second possible implementation manner, the electronic device includes a verification unit configured to verify the storage address information and the storage capacity information after the storage address information and the storage capacity information of the running code and the running data are read from the firmware CMOS, and before the running code and the running data are read from the hardware storage device according to the storage address information and the storage capacity information.

With reference to the first possible implementation manner of the second aspect, in a third possible implementation manner, the data reading unit is further configured to read, from the CMOS, the storage address information and the storage capacity information in a SMM.

With reference to the third possible implementation manner of the second aspect, in a fourth possible implementation manner, the electronic device includes a signature unit, before the electronic device reads, from the CMOS, the storage address information and the storage capacity information in the SMM configured to digitally sign the storage address information and the storage capacity information of the running code and the running data in the running process of the VMM, and write, into the CMOS, the storage address information and the storage capacity information that are digitally signed.

With reference to the second aspect or any one of the first to the fourth possible implementation manners, in a fifth possible implementation manner, the storage unit is further configured to, if first verification information has not been stored currently, store the newly generated first verification information, or if first verification information has been stored currently, replace the stored first verification information with the newly generated first verification information, or store the newly generated first verification information and first time at which the first verification information is newly generated such that the trusted data center determines, according to second time in the log information and the first time acquired from the electronic device, first verification information used for measuring the electronic device.

With reference to the second aspect or any one of the first to the fifth possible implementation manners, in a sixth possible implementation manner, the storage unit is further configured to store the first verification information in a TPM chip of the electronic device.

With reference to the second aspect or any one of the first to the sixth possible implementation manners, in a seventh possible implementation manner, the verification information generating unit is further configured to perform hash calculation on the running code and the running data, and use a generated hash value as the first verification information.

According to a third aspect of the present disclosure, an electronic device is provided, including a hardware storage device configured to store running code and running data that are in a running process of a VMM, a controller configured to read the running code and the running data from the hardware storage device, and generate and store first verification information according to the running code and the running data, and a sender configured to transmit, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

With reference to the third aspect, in a first possible implementation manner, the controller is further configured to read storage address information and storage capacity information of the running code and the running data from firmware CMOS, and read the running code and the running data from the hardware storage device according to the storage address information and the storage capacity information.

With reference to the first possible implementation manner of the third aspect, in a second possible implementation manner, the controller is further configured to verify the storage address information and the storage capacity information after the storage address information and the storage capacity information of the running code and the running data are read from the CMOS, and before the running code and the running data are read from the hardware storage device according to the storage address information and the storage capacity information.

With reference to the first possible implementation manner of the third aspect, in a third possible implementation manner, the controller is further configured to read, from the CMOS, the storage address information and the storage capacity information in a SMM.

With reference to the third possible implementation manner of the third aspect, in a fourth possible implementation manner, the controller is further configured to, before the storage address information and the storage capacity information are read from the CMOS in the SMM, digitally sign the storage address information and the storage capacity information of the running code and the running data in the running process of the VMM, and write, into the CMOS, the storage address information and the storage capacity information that are digitally signed.

With reference to the third aspect or any one of the first to the fourth possible implementation manners, in a fifth possible implementation manner, the controller is further configured to, when first verification information has not been stored currently, store the newly generated first verification information; or when first verification information has been stored currently, replace the stored first verification information with the newly generated first verification information, or store the newly generated first verification information and first time at which the first verification information is newly generated such that the trusted data center determines, according to second time in the log information and the first time acquired from the electronic device, first verification information used for measuring the electronic device.

With reference to the third aspect or any one of the first to the fifth possible implementation manners, in a sixth possible implementation manner, the controller is further configured to store the first verification information in a TPM chip of the electronic device.

With reference to the third aspect or any one of the first to the sixth possible implementation manners, in a seventh possible implementation manner, the controller is further configured to perform hash calculation on the running code and the running data, and use a generated hash value as the first verification information.

According to a fourth aspect of the present disclosure, a measurement system is provided, including an electronic device configured to read, from a hardware storage device, running code and running data that are in a running process of a VMM, generate and store first verification information according to the running code and the running data, and transmit, to a trusted data center, log information generated in a process that is from reading, by the electronic device, the running code and the running data to storing, by the electronic device, the first verification information, and the trusted data center configured to receive the log information sent by the electronic device, acquire the first verification information from the electronic device, and measure the electronic device using the first verification information and second verification information that is generated according to the log information.

Beneficial effects of the present disclosure are as follows.

In the embodiments of the present disclosure, technical solutions of the present application include running code and running data are read from a hardware storage device, and first verification information is generated according to the running code and the running data. Then, the first verification information is stored, and log information, which is generated in a process that is from reading, by an electronic device, the running code and the running data to storing, by the electronic device, the first verification information, is transmitted to a trusted data center such that the trusted data center measures the electronic device using the first verification information acquired from the electronic device and second verification information generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device according to the second verification information and the first verification information. Because a running process of an operating system is not disrupted in the foregoing measurement process, while a running process of an operating system is disrupted in the prior art, security of the electronic device is higher in the technical solutions of the present application, and the electronic device can be measured more accurately.

DESCRIPTION OF EMBODIMENTS

Regarding technical problems of low security and low measurement accuracy in a process of measuring an existing electronic device, in technical solutions proposed in embodiments of the present disclosure, running code and running data are stored in a hardware storage device, and tampering with the running code and the running data in the hardware storage device is more difficult. Therefore, security is higher. Further, generated first verification information is more accurate, and a trusted data center can measure an electronic device more accurately when measuring the electronic device using the first verification information acquired from the electronic device and second verification information generated according to log information. Because a running process of an operating system is not disrupted in the foregoing measurement process, security of the electronic device is higher in the technical solutions of the present application, and the electronic device can be measured more accurately.

The following describes main implementation principles, specific implementation manners, and beneficial effects of the technical solutions in the embodiments of the present disclosure in detail with reference to the accompanying drawings.

Embodiment 1

Figure 1:
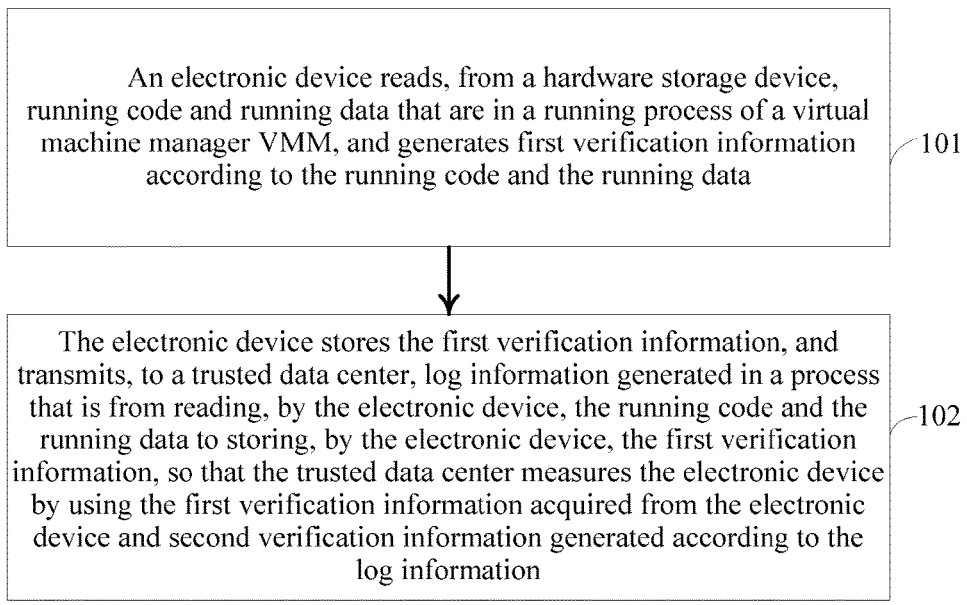
FIG. 1 is a first flowchart of a measurement method according to an embodiment of the present disclosure.

Embodiment 1 of the present disclosure proposes a measurement method. As shown in FIG. 1, a specific processing procedure of the method is as follows.

Step 101: An electronic device reads, from a hardware storage device, running code and running data that are in a running process of a VMM, and generates first verification information according to the running code and the running data.

Step 102: The electronic device stores the first verification information, and transmits, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

In step 101, the electronic device reads, from the hardware storage device, the running code and the running data that are in the process of running the VMM, and generates the first verification information according to the running code and the running data.

Further, the hardware storage device may be a hard disk, a register, a memory of the electronic device. The running data is, for example, data included in a data table, such as a hypercall table called in a running process of the running code, an exception table, an interrupt descriptor table (IDT), or a global descriptor table (GDT).

In a specific implementation process, in the process of running the VMM by the electronic device, the running code and the running data that are in the process of running the VMM are written into the hardware storage device such that the electronic device can read the running code and the running data from the hardware storage device, and may perform digital digest calculation on the running code and the running data. For example, hash calculation may be performed on the running code and the running data to obtain the first verification information, where a message-digest algorithm 5 (MD5), a secure hash algorithm 1 (SHA-1), or the like may be used when the hash calculation is performed.

In the process of running the VMM by the electronic device, the electronic device writes, into the hardware storage device, the running code and the running data that are in the process of running the VMM, and tampering with the running code and the running data in the hardware storage device is more difficult. Therefore, security is higher. Furthermore, in the process of measuring the electronic device, comparison needs to be made after corresponding calculation is performed on the running code and the running data, which can improve accuracy of measuring the electronic device in a case in which the security of the running code and the running data is higher.

Furthermore, when the hash calculation is performed on the running code and the running data, the electronic device performs the hash calculation on the running code and the running data after reading the running code and the running data, and uses a generated hash value as the first verification information.

Using the MD5 algorithm as an example, the running code and the running data, for example, "0111 1000 1100 0101 1001 0001 0000 1110", are read from a desktop computer, an operation is performed on "0111 1000 1100 0101 1001 0001 0000 1110" using the MD5 algorithm, and an MD5 value ee99d7b0025c7038 is obtained. A change of any character in the running code and the running data may lead to a change of the generated MD5 value. Therefore, whether the running code and the running data are tampered with can be determined using the MD5 value.

Furthermore, the reading, by an electronic device from a hardware storage device, running code and running data that are in a process of running a VMM further includes reading, by the electronic device from firmware CMOS, storage address information and storage capacity information of the running code and the running data, and reading, by the electronic device from the hardware storage device, the running code and the running data according to the storage address information and the storage capacity information.

In a specific implementation process, to further improve the security of the running code and the running data, the storage address information and the storage capacity information are stored in the CMOS in the process of running the VMM, and then the electronic device may read the storage address information and the storage capacity information from the CMOS, and read, from the hardware storage device, the running code and the running data according to the storage address information and the storage capacity information. Because the storage address information and the storage capacity information are stored in the CMOS in the process of running the VMM, a probability that the storage address information and the storage capacity information are tampered with is decreased. The storage address information and the storage capacity information are stored in the hardware device CMOS. In this way, security is higher for the running code and the running data that are obtained by the electronic device according to the storage address information and the storage capacity information that are read from the CMOS.

After the storage address information and the storage capacity information are acquired, the running code and the running data are determined according to the storage capacity information and a start address of the storage address information. The storage address information may be represented using a logical address and a physical address. The storage capacity information may be, for example, capacity of 1 megabyte (MB), 500 kilobyte (KB), 10 MB, or the like.

Using a desktop computer as an example, storage address information stored in a CMOS of the desktop computer is 0x0001100-0x0003a00, and storage capacity information is 5 KB. The desktop computer first reads data stored at a start address 0x0001100 of the storage address information, and then successively reads data stored at storage addresses after 0x0001100. When storage capacity of data read by the desktop computer is 5 KB, reading data is terminated. The 5 KB data read by the desktop computer is the running code and the running data.

In another embodiment, the reading, by the electronic device from a CMOS, storage address information and storage capacity information of the running code and the running data further includes reading, by the electronic device from the CMOS, the storage address information and the storage capacity information in a SMM.

In a specific implementation process, the SMM may be entered by triggering a SMI manually or at scheduled time. The electronic device reads, from the CMOS, the storage address information and the storage capacity information in the SMM. Reading the storage address information and the storage capacity information from the CMOS in the SMM is invisible to an operating system of the electronic device, thereby ensuring that the storage address information and the storage capacity information that are read from the CMOS are shielded and secure.

Further, before the reading, by the electronic device from the CMOS, the storage address information and the storage capacity information in a SMM, the method further includes digitally signing, by the electronic device, the storage address information and the storage capacity information of the running code and the running data in the running process of the VMM, and writing, into the CMOS, the storage address information and the storage capacity information that are digitally signed.

In a specific implementation process, to further improve the security of the storage address information and the storage capacity information, the electronic device digitally signs the storage address information and the storage capacity information in the running process of the VMM, and then writes, into the CMOS, the storage address information and the storage capacity information that are digitally signed such that the electronic device detects, by verifying the storage address information and the storage capacity information, whether the storage address information and the storage capacity information are tampered with, thereby improving the security of the storage address information and the storage capacity information.

When digitally signing is performed on the storage address information and the storage capacity information, signing may be performed on the storage address information and the storage capacity information using an Rivest, Shamir and Adleman (RSA) algorithm, a digital signal algorithm (DSA), or the like such that it can be determined, by means of verification, whether the storage address information and the storage capacity information are tampered with.

Certainly, the electronic device may enter the SMM by means of triggering the SMI at scheduled time or manually, then in the SMM, digitally sign the storage address information and the storage capacity information, and write the storage address information and the storage capacity information that are signed into the CMOS. In this way, the execution process of digitally signing the storage address information and the storage capacity information and writing digitally signed data into the CMOS is transparent to the operating system of the electronic device. That is, the execution process is invisible to the operating system. In this way, it is further ensured that the storage address information and the storage capacity information that are read from the CMOS are shielded and secure.

Further, after the reading, by the electronic device from firmware CMOS, storage address information and storage capacity information of the running code and the running data and before the reading, from the hardware storage device, the running code and the running data according to the storage address information and the storage capacity information, the method further includes verifying, by the electronic device, the storage address information and the storage capacity information.

In a specific implementation process, when storing the memory address information and the storage capacity information in the CMOS, the electronic device digitally signs the memory address information and the storage capacity information. Therefore, after reading the memory address information and the storage capacity information, the electronic device further needs to verify the storage address information and the storage capacity information in order to determine whether the memory address information and the storage capacity information are tampered with. After the verification succeeds, that is, when the electronic device determines that the verification on the storage address information and the storage capacity information is successful, the running code and the running data are read from the hardware storage device according to the storage address information and the storage capacity information. When the verification is unsuccessful, processing directly ends, and it is determined that security of the electronic device is low and an access risk exists.

Because the electronic device reads, from the CMOS, the storage knowing information and the storage capacity information that are digitally signed, the storage knowing information and the storage capacity information that are digitally signed need to be verified. When the verification is successful, it may be determined that the storage address information and the storage capacity information are not tampered with, and in this case, the running code and the running data that are acquired using the storage address information and the storage capacity information have higher security. When the verification is unsuccessful, it may be determined that the storage address information and the storage capacity information are tampered with, then processing directly ends, and it is determined that the security of the electronic device is low and an access risk exists.

Next, step 102 is performed. In the step, the electronic device stores the first verification information, and transmits, to the trusted data center, the log information generated in the process that is from reading, by the electronic device, the running code and the running data to storing, by the electronic device, the first verification information such that the trusted data center measures the electronic device using the first verification information acquired from the electronic device and the second verification information generated according to the log information.

In the processes of generating the log information and transmitting the log information to the trusted data center, the log information may be tampered with, which causes that the second verification information generated by the trusted data center according to the log information is different from the first verification information. Information about each operation performed by the electronic device starting from reading, by the electronic device, the running code and the running data and prior to storing the first verification information, and corresponding timestamp information are recorded in the log information such that the trusted data center obtains the second verification information according to the log information and according to the running code and the running data that are in the process of running the VMM by the electronic device and that are corresponding to the log information.

In a specific implementation process, the electronic device may store the first verification information in a hardware storage device, such as a hard disk or a register, of the electronic device in order to decrease a probability of tampering with the first verification information, thereby ensuring security of the first verification information. To further improve the security of the first verification information, the first verification information may be stored in a TPM chip of the electronic device. Furthermore, the first verification information may be stored in a platform configuration register (PCR) of the TPM chip.

The TPM chip refers to a security chip that conforms to a standard developed by a trusted computing group (TCG). The TPM chip can effectively protect a personal computer (PC) and prevent unauthorized user access, and therefore can effectively ensure the security of the first verification information. In addition, the TPM chip can interact with the trusted data center, and the trusted data center may read the first verification information in the PCR using an access point (locality) such that the trusted data center may measure the electronic device according to the second verification information and the first verification information.

Further, when the electronic device stores the first verification information, if first verification information has not been stored currently, the electronic device stores the newly generated first verification information. If first verification information has been stored currently, the electronic device replaces the stored first verification information with the newly generated first verification information, or the electronic device stores the newly generated first verification information and first time at which the first verification information is newly generated such that the trusted data center determines, according to second time in the log information and the first time acquired from the electronic device, first verification information used for measuring the electronic device.

Furthermore, when the electronic device stores the first verification information, if first verification information has not been stored currently, the electronic device stores the newly generated first verification information. When first verification information has been stored currently, the electronic device replaces the stored first verification information with the newly generated first verification information. Because the electronic device stores only one piece of first verification information in these two cases, the trusted data center can accurately acquire the first verification information corresponding to the log information. Therefore, a problem that the first verification information does not correspond to the second verification information will not occur.

Further, when first verification information has been stored currently, the electronic device stores the newly generated first verification information and the first time at which the first verification information is newly generated. Because the electronic device stores multiple pieces of first verification information, the first time at which the first verification information is newly generated further needs to be stored when the first verification information is stored such that the trusted data center determines, according to the second time in the log information and the first time acquired from the electronic device, the first verification information used for measuring the electronic device.

For example, using a desktop computer as an example, the desktop computer generates first verification information "1001 0001" at a moment of 11:15:20 in a process of processing data "1100 0001 1000 1110", and first verification information, namely "0001 1000" has been stored in a PCR of a TPM chip of the desktop computer. If "1001 0001" is stored in the PCR but the time is not stored, the trusted data center may measure the desktop computer using "0001 1000" and second verification information that is generated according to log information of the data "1100 0001 1000 1110". Because the first verification information corresponding to the data "1100 0001 1000 1110" is "1001 0001", incorrect measurement is performed on the desktop computer by the trusted data center. However, when the time 11:15:20 at which "1001 0001" is generated is stored in the PCR, the trusted data center can determine, according to a timestamp in the log information, that the first verification information is "1001 0001" instead of "0001 1000", thereby improving accuracy of measuring the electronic device.

Figure 2:
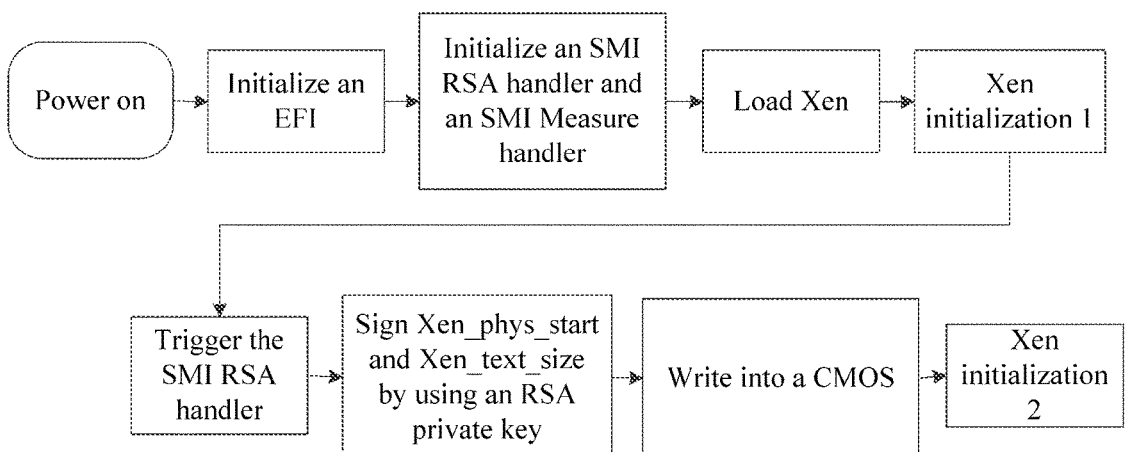
FIG. 2 is a flowchart of signing storage address information and storage capacity information according to an embodiment of the present disclosure.

The technical solutions of the present application may be implemented based on an extensible firmware interface (EFI) and a unified extensible firmware interface (UEFI). A specific implementation manner is as follows:

Using the EFI as an example, referring to FIG. 2, system interrupt measurement programs (SMI measure handler) triggered at scheduled time and triggered manually and a system interrupt signature program (SMI RSA handler) are added to the EFI. The SMI measure handler includes an RSA decryption and verification algorithm and a RSA public key, and the SMI RSA handler includes an RSA digital signature algorithm and an RSA private key, where the RSA public/private key pair is generated by a program in advance.

After the electronic device is powered on, the EFI is initialized to boot up the electronic device to be started. After the initialization of the EFI is complete, the SMI measure handler and the SMI RSA handler are initialized. After the electronic device is started, in a process of starting an open source code virtual machine monitor (Xen) and when storage address information and storage capacity information that are of running code of the Xen and running data generated in an execution process of the running code are written to a specified address in the CMOS, the SMI RSA handler is triggered to sign the storage address information and the storage capacity information in order to strengthen security of the storage address information and the storage capacity information.

Figure 3:
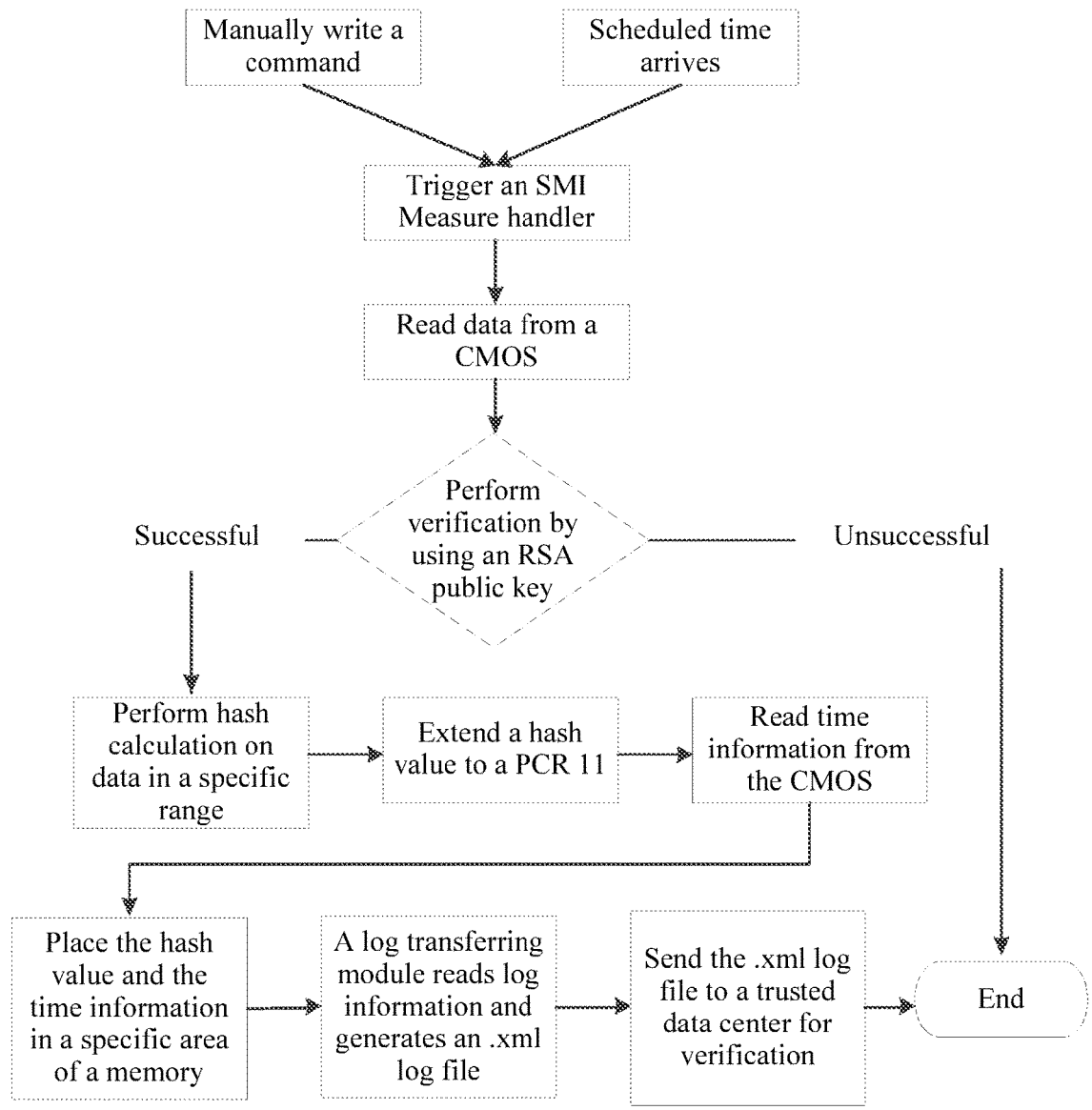
FIG. 3 is a flowchart of measuring an electronic device according to an embodiment of the present disclosure.

Referring to FIG. 3, when the electronic device is measured manually or at scheduled time, the electronic device enters a SMM, calls the SMI measure handler, actively reads the storage address information and the storage capacity information from the CMOS to perform signature verification, acquires the running code and the running data according to the storage address information and the storage capacity information when the verification is successful, performs hash calculation on the running code and the running data to obtain a first hash value, stores the hash value to the PCR of the TPM chip of the electronic device using locality, transmits, to the trusted data center using locality, latest log information that is generated before the hash value is stored in the PCR, and then exits from the SMM. Then, the trusted data center generates a second hash value according to the log information. If the log information is not tampered with, the second hash value is the same as the first hash value. If the log information is tampered with, the second hash value is different from the first hash value. Therefore, the electronic device may be measured by comparing the first hash value with the second hash value. In addition, the technical solutions of the present application may not only be implemented in the Xen, but also be implemented in another VMM, for example, be implemented in a kernel-based virtual machine (KVM), which increases transplantability of a calculation solution of the present application.

In this embodiment of the present disclosure, a technical solution of the present application includes running code and running data are read from a hardware storage device, and first verification information is generated according to the running code and the running data. Then, the first verification information is stored, and log information, which is generated in a process that is from reading, by an electronic device, the running code and the running data to storing, by the electronic device, the first verification information, is transmitted to a trusted data center such that the trusted data center measures the electronic device using the first verification information acquired from the electronic device and second verification information generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device according to the second verification information and the first verification information. Because a running process of an operating system is not disrupted in the foregoing measurement process, while a running process of an operating system is disrupted in the prior art, security of the electronic device is higher in the technical solution of the present application, and the electronic device can be measured more accurately.

The measurement process of the trusted data center is further introduced in the following steps.

Figure 4:
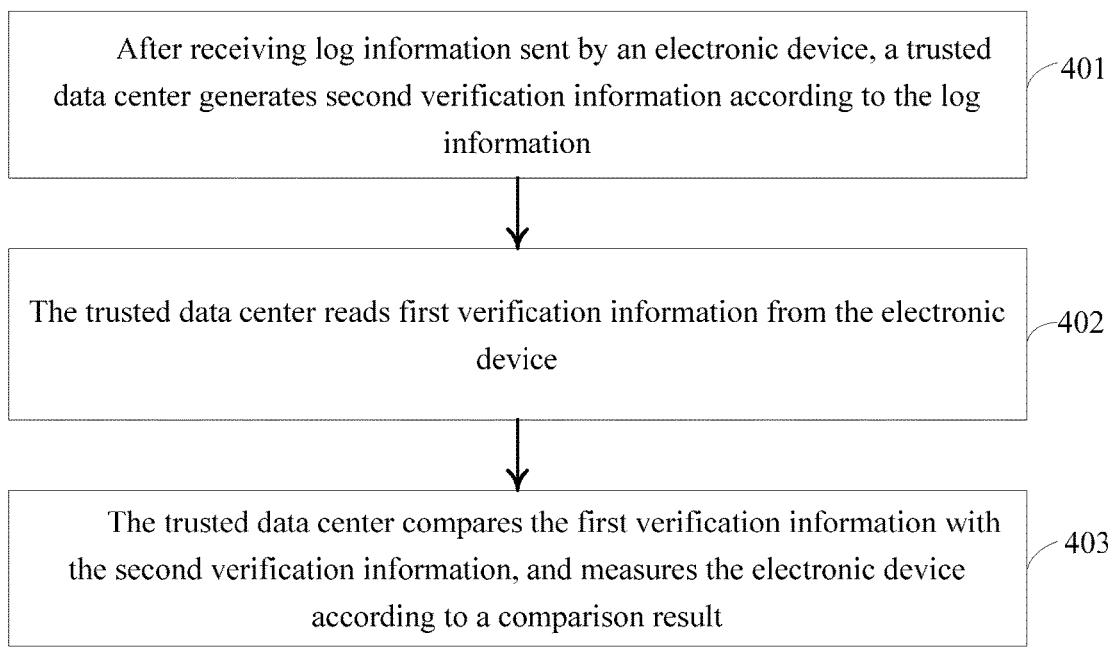
FIG. 4 is a flowchart of measuring an electronic device by a trusted data center according to an embodiment of the present disclosure.

As shown in FIG. 4, the measurement process is as follows.

Step 401: After receiving log information sent by the electronic device, the trusted data center generates second verification information according to the log information.

Step 402: The trusted data center reads first verification information from the electronic device.

Step 403: The trusted data center compares the first verification information with the second verification information, and measures the electronic device according to a comparison result.

In step 401, after receiving the log information sent by the electronic device, the trusted data center generates the second verification information according to the log information.

Further, the trusted data center is, for example, a desktop computer, a notebook computer, or another electronic device.

In a specific implementation process, it has been described in detail in Embodiment 1 that information about each operation performed by the electronic device starting from reading, by the electronic device, the running code and the running data and prior to storing the first verification information, and corresponding timestamp information are recorded in the log information such that the trusted data center obtains the second verification information according to the log information and according to the running code and the running data that are in the process of running the VMM by the electronic device and that are corresponding to the log information.

After reading the running code and the running data according to the log information, the trusted data center may perform digital digest calculation on the running code and the running data. For example, hash calculation may be performed on the running code and the running data to obtain the first verification information, where an MD5 algorithm, an SHA-1 algorithm, or the like may be used when the hash calculation is performed.

Further, algorithms used by the electronic device and the trusted data center are the same such that the second verification information is the same as the first verification information when the log information is not tampered with, and the second verification information is different from the first verification information when the log information is tampered with. Then, the electronic device may be measured according to the first verification information and the second verification information.

For example, that data at a storage address 0x0001100-0x0002a00 of the electronic device is read at 10:15:20 and hash calculation is performed on the data at 0x0001100-0x0002a00 is recorded in the log information. The trusted data center reads the data at 0x0001100-0x0002a00 again according to 0x0001100-0x0002a00, and performs hash calculation on the data at 0x0001100-0x0002a00 to generate a second hash value used as the second verification information.

Next, step 402 is performed. In this step, the trusted data center reads the first verification information from the electronic device. In a specific implementation process, the trusted data center first determines address information, stored in the electronic device, of the first verification information, and reads the first verification information from the electronic device according to the address information.

Step 401 and step 402 may be performed at the same time, or step 402 may be performed first, and then step 401 is performed, and no specific limitation is imposed in the present application.

Certainly, the trusted data center may receive the first verification information sent by the electronic device, instead of directly reading the first verification information from the electronic device.

Further, when the first verification information is stored in a PCR of a TPM chip of the electronic device, the trusted data center accesses the TPM chip using locality, and reads the first verification information from the PCR.

Because the electronic device may store only one piece of first verification information, the trusted data center can accurately acquire the first verification information corresponding to the log information. Therefore, a problem that the first verification information does not correspond to the second verification information will not occur. When the electronic device stores multiple pieces of first verification information, the trusted data center reads the first verification information from the electronic device according to time information in the log information such that the first verification information read from the electronic device corresponds to the second verification information, and the electronic device can be measured more accurately when the electronic device is measured using the first verification information and the second verification information.

For example, using a desktop computer as an example, "1001 0001" and time information 10:15:25 corresponding to "1001 0001", and "0001 1000" and time information 10:25:15 corresponding to "0001 1000" are stored in a PCR of a TPM chip of the desktop computer, and time information that the trusted data center extracts from the log information is 10:15:25. In this case, the trusted data center reads the first verification information "1001 0001" instead of "0001 1000" from the PCR. Therefore, the first verification information read from the electronic device corresponds to the second verification information, which can improve accuracy of measuring the electronic device.

Next, step 403 is performed. In this step, the trusted data center compares the first verification information with the second verification information, and measures the electronic device according to the comparison result.

In a specific implementation process, when the log information is not tampered with, the second verification information is the same as the first verification information. When the log information is tampered with, the second verification information may be different from the first verification information. Therefore, when the comparison result indicates that the first verification information is the same as the second verification information, it may be determined that the electronic device is secure and can be accessed. Otherwise, it may be determined that the electronic device is insecure and access incurs a risk.

For example, when data read by the trusted data center according to the log information is "1000 0001 1101 0111 1000", MD5 calculation is performed on "1000 0001 1101 0111 1000" to obtain second verification information 662b2e1f62680562. However, the first verification information read from the electronic device by the trusted data center is 24c3d7c9697a7dce. Because the second verification information is different from the first verification information, it indicates that the log information is tampered with, and it may be determined that the electronic device is insecure and access incurs a risk. If the first verification information read from the electronic device by the trusted data center is 662b2e1f62680562, it may be determined that the electronic device is secure and can be accessed.

In another embodiment, after the comparing, by the trusted data center, the first verification information with the second verification information, and measuring the electronic device according to a comparison result, the measurement process further includes acquiring, by the trusted data center, initial measurement information in the log information according to the log information; and comparing, by the trusted data center, a baseline value stored in the trusted data center with the initial measurement information, and measuring the electronic device again according to a comparison result, where the baseline value corresponds to the initial measurement information.

Further, to ensure higher accuracy of measuring the electronic device, after the electronic device is measured according to the comparison result, storage address information and storage capacity information of the running code and the running data may further be read from a CMOS according to the log information, data in the storage address information is divided into at least two parts of data according to the storage address information, at least two pieces of third verification information used as the initial measurement information are generated according to the at least two parts of data, and the at least two pieces of third verification information are compared with the baseline value. When the at least two pieces of third verification information match the baseline value, it may be determined that the electronic device is secure and can be accessed. When the at least two pieces of third verification information do not match the baseline value, it may be determined that the electronic device is insecure and access incurs a risk.

Furthermore, the baseline value is at least two pieces of fourth verification information generated by the electronic device in the SMM according to the at least two parts of data. For details about an implementation manner in which the at least two pieces of fourth verification information are generated, reference may be made to an implementation manner in which the first verification information is generated. Then, the at least two pieces of fourth verification information are transmitted to the trusted data center using a universal serial bus (USB) or in a wireless manner. The at least two pieces of third verification information are compared with the at least two pieces of fourth verification information. When the at least two pieces of third verification information match the at least two pieces of fourth verification information, it may be determined that the electronic device is secure and can be accessed. When the at least two pieces of third verification information do not match the at least two pieces of fourth verification information, it may be determined that the electronic device is insecure and access incurs a risk.

The at least two pieces of fourth verification information may be verification information generated according to the running code and verification information generated according to the running data.

For example, a size of entire data of the running code and the running data that are acquired according to the storage address information of the running code and the running data is 12 MB, and the 10 MB data, starting from a start address, is successively divided into three pieces of 4 MB data equivalently to obtain a data module 1, a data module 2, and a data module 3. SHA-1 calculation is separately performed on the data module 1, the data module 2, and the data module 3 to obtain Hash-1 corresponding to the data module 1, Hash-2 corresponding to the data module 2, and Hash-3 corresponding to the data module 3. Hash-1 and time a at which Hash-1 is generated, Hash-2 and time b at which Hash-2 is generated, and Hash-3 and time c at which Hash-3 is generated may be stored in the PCR, and Hash-1 and a, Hash-2 and b, and Hash-3 and c are transmitted to the trusted data center.

Further, when the trusted data center receives the log information sent by the electronic device, SHA-1 calculation may be performed on the data module 1, the data module 2, and the data module 3 again to acquire Hash-1-1 corresponding to the data module 1, Hash-2-1 corresponding to the data module 2, and Hash-3-1 corresponding to the data module 3. Then, according to time information in the log information, Hash-1 is compared with Hash-1-1, Hash-2 is compared with Hash-2-1, Hash-3 is compared with Hash-3-1. When Hash-1 and Hash-1-1 are the same, Hash-2 and Hash-2-1 are the same, and Hash-3 and Hash-3-1 are the same, it may be determined that the electronic device is secure and can be accessed. If any one pair of Hash-1 and Hash-1-1, Hash-2 and Hash-2-1, and Hash-3 and Hash-3-1 is different, for example, when Hash-1 is different from Hash-1-1, it may be determined that the electronic device is insecure and access incurs a risk.

In this embodiment, a technical solution of the present application includes running code and running data are read from a hardware storage device, and first verification information is generated according to the running code and the running data. Then, the first verification information is stored, and latest log information that is generated before the first verification information is stored is transmitted to a trusted data center such that the trusted data center measures an electronic device using the first verification information and second verification information that is generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device using the first verification information and the second verification information that is generated according to the log information. Because a running process of an operating system is not disrupted in the foregoing measurement process, while a running process of an operating system is disrupted in the prior art, security of the electronic device is higher in the technical solution of the present application, and the electronic device can be measured more accurately.

Embodiment 2

Figure 5:
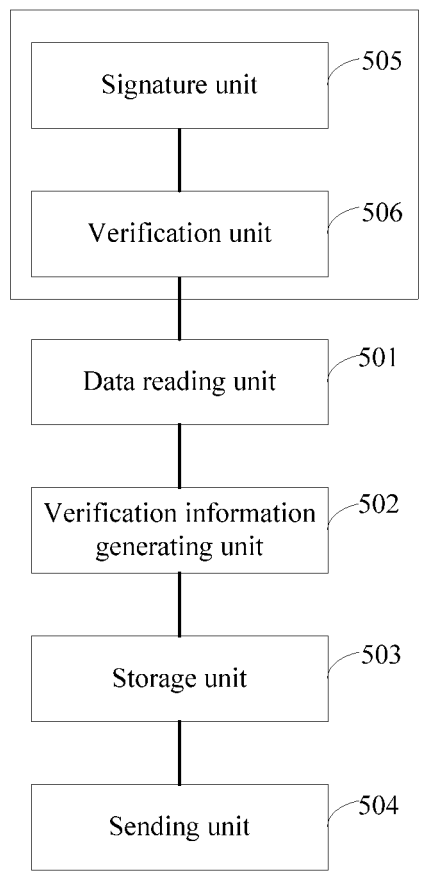
FIG. 5 is a first structural diagram of an electronic device according to an embodiment of the present disclosure.

Embodiment 2 of the present disclosure proposes an electronic device. As shown in FIG. 5, the electronic device includes a data reading unit 501 configured to read, from a hardware storage device, running code and running data that are in a running process of a VMM, a verification information generating unit 502 configured to receive the running code and the running data that are sent by the data reading unit 501, and generate first verification information according to the running code and the running data, a storage unit 503 configured to receive the first verification information sent by the verification information generating unit 502, and store the first verification information, and a sending unit 504 configured to transmit, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

The electronic device is, for example, a desktop computer, a notebook computer, or another electronic device. Further, the hardware storage device may be a hard disk, a register, a memory, or another electronic device of the electronic device. The running data is, for example, data included in a data table, such as a hypercall table called in a running process of the running code, an exception table, an IDT, or a GDT.

Preferably, the data reading unit 501 is further configured to read storage address information and storage capacity information of the running code and the running data from firmware CMOS, and read the running code and the running data from the hardware storage device according to the storage address information and the storage capacity information.

Preferably, the data reading unit 501 is further configured to read, from the CMOS, the storage address information and the storage capacity information in a SMM.

Further, the electronic device includes a signature unit 505, before the electronic device reads, from the CMOS, the storage address information and the storage capacity information in the SMM configured to digitally sign the storage address information and the storage capacity information of the running code and the running data in the running process of the VMM, and write, into the CMOS, the storage address information and the storage capacity information that are digitally signed.

By means of triggering SMI at scheduled time or manually, entering the SMM, then digitally signing the storage address information and the storage capacity information in the SMM, and writing the storage address information and the storage capacity information that are signed into the CMOS, the electronic device may enable the execution process of digitally signing the storage address information and the storage capacity information and writing digitally signed data into the CMOS to be transparent to an operating system of the electronic device. That is, the execution process is invisible to the operating system. In this way, it is further ensured that the storage address information and the storage capacity information that are read from the CMOS are shielded and secure.

To improve the security of the storage address information and the storage capacity information further, the electronic device digitally signs the storage address information and the storage capacity information in the running process of the VMM, and then writes, into the CMOS, the storage address information and the storage capacity information that are digitally signed such that the electronic device detects, by verifying the storage address information and the storage capacity information, whether the storage address information and the storage capacity information are tampered with, thereby improving the security of the storage address information and the storage capacity information.

Preferably, because the signature unit digitally signs the storage address information and the storage capacity information, correspondingly, the electronic device further includes a verification unit 506 configured to verify the storage address information and the storage capacity information after the storage address information and the storage capacity information of the running code and the running data are read from the firmware CMOS, and before the running code and the running data are read from the hardware storage device according to the storage address information and the storage capacity information.

Because the electronic device reads, from the CMOS, the storage knowing information and the storage capacity information that are digitally signed, the storage knowing information and the storage capacity information that are digitally signed need to be verified by the verification unit 506. When the verification is successful, it may be determined that the storage address information and the storage capacity information are not tampered with, and in this case, the running code and the running data that are acquired using the storage address information and the storage capacity information have higher security. When the verification is unsuccessful, it may be determined that the storage address information and the storage capacity information are tampered with, then processing directly ends, and it is determined that the security of the electronic device is low and an access risk exists.

Preferably, the storage unit 503 is further configured to, if first verification information has not been stored currently, store the newly generated first verification information, or if first verification information has been stored currently, replace the stored first verification information with the newly generated first verification information, or store the newly generated first verification information and first time at which the first verification information is newly generated such that the trusted data center determines, according to second time in the log information and the first time acquired from the electronic device, first verification information used for measuring the electronic device.

Preferably, the storage unit 503 is further configured to store the first verification information in a TPM chip of the electronic device.

The TPM chip refers to a security chip that conforms to a standard developed by a TCG. The TPM chip can effectively protect a PC and prevent unauthorized user access, and therefore can effectively ensure the security of the first verification information. In addition, the TPM chip can interact with the trusted data center, and the trusted data center may read the first verification information in a PCR using a locality such that the trusted data center may measure the electronic device according to the second verification information and the first verification information.

Preferably, the verification information generating unit 502 is further configured to perform hash calculation on the running code and the running data, and use a generated hash value as the first verification information.

In this embodiment of the present disclosure, a technical solution of the present application includes running code and running data are read from a hardware storage device, and first verification information is generated according to the running code and the running data. Then, the first verification information is stored, and log information, which is generated in a process that is from reading, by an electronic device, the running code and the running data to storing, by the electronic device, the first verification information, is transmitted to a trusted data center such that the trusted data center measures the electronic device using the first verification information acquired from the electronic device and second verification information generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device according to the second verification information and the first verification information. Because a running process of an operating system is not disrupted in the foregoing measurement process, while a running process of an operating system is disrupted in the prior art, security of the electronic device is higher in the technical solution of the present application, and the electronic device can be measured more accurately.

Embodiment 3

Figure 6:
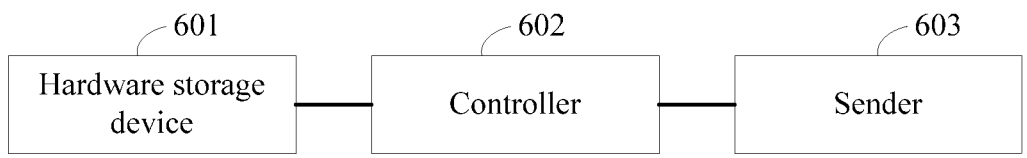
FIG. 6 is a second structural diagram of an electronic device according to an embodiment of the present disclosure.

Embodiment 3 of the present disclosure proposes an electronic device. As shown in FIG. 6, the electronic device includes a hardware storage device 601 configured to store running code and running data that are in a running process of a VMM, a controller 602 configured to read, the running code and the running data from the hardware storage device 601, and generate and store first verification information according to the running code and the running data, and a sender 603 configured to transmit, to a trusted data center, log information generated in a process that is from reading, by the electronic device, the running code and the running data to storing, by the electronic device, the first verification information such that the trusted data center measures the electronic device using the first verification information acquired from the electronic device and second verification information generated according to the log information.

The electronic device is, for example, a desktop computer, a notebook computer, or another electronic device. Further, the hardware storage device 601 may be a hard disk, a register, a memory, or another electronic device of the electronic device. The running data is, for example, data included in a data table, such as a hypercall table called in a running process of the running code, an exception table, an IDT, or a GDT.

Further, the controller 602 is, for example, a separate processing chip, or may be integrated in a processor of the electronic device. Further, the sender 603 is for example, a WiFi module, a wireless network interface card, or another electronic device.

Preferably, the controller 602 is further configured to read storage address information and storage capacity information of the running code and the running data from firmware CMOS, and read the running code and the running data from the hardware storage device according to the storage address information and the storage capacity information.

Preferably, the controller 602 is further configured to read, from the CMOS, the storage address information and the storage capacity information in a SMM.

Preferably, the controller 602 is further configured to, before the storage address information and the storage capacity information are read from the CMOS in the SMM, digitally sign the storage address information and the storage capacity information of the running code and the running data in the running process of the VMM, and write, into the CMOS, the storage address information and the storage capacity information that are digitally signed.

Preferably, the controller 602 is further configured to verify the storage address information and the storage capacity information after the storage address information and the storage capacity information of the running code and the running data are read from the CMOS, and before the running code and the running data are read from the hardware storage device according to the storage address information and the storage capacity information.

Preferably, the controller 602 is further configured to, when first verification information has not been stored currently, store the newly generated first verification information, or when first verification information has been stored currently, replace the stored first verification information with the newly generated first verification information, or store the newly generated first verification information and first time at which the first verification information is newly generated such that the trusted data center determines, according to second time in the log information and the first time acquired from the electronic device, first verification information used for measuring the electronic device.

Preferably, the controller 602 is further configured to store the first verification information in a TPM chip of the electronic device.

The TPM chip refers to a security chip that conforms to a standard developed by a TCG. The TPM chip can effectively protect a PC and prevent unauthorized user access, and therefore can effectively ensure the security of the first verification information. In addition, the TPM chip can interact with the trusted data center, and the trusted data center may read the first verification information in a PCR using a locality such that the trusted data center may measure the electronic device according to the second verification information and the first verification information.

Preferably, the controller 602 is further configured to perform hash calculation on the running code and the running data, and use a generated hash value as the first verification information.

In this embodiment of the present disclosure, a technical solution of the present application includes running code and running data are read from a hardware storage device, and first verification information is generated according to the running code and the running data. Then, the first verification information is stored, and log information, which is generated in a process that is from reading, by an electronic device, the running code and the running data to storing, by the electronic device, the first verification information, is transmitted to a trusted data center such that the trusted data center measures the electronic device using the first verification information acquired from the electronic device and second verification information generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device according to the second verification information and the first verification information. Because a running process of an operating system is not disrupted in the foregoing measurement process, while a running process of an operating system is disrupted in the prior art, security of the electronic device is higher in the technical solution of the present application, and the electronic device can be measured more accurately.

Embodiment 4

Figure 7:
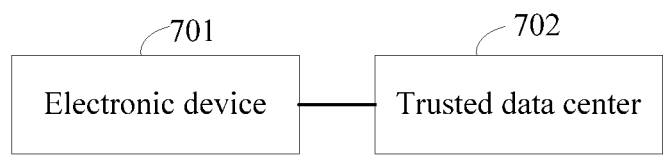
FIG. 7 is a structural diagram of a measurement system according to an embodiment of the present disclosure.

Embodiment 4 of the present disclosure proposes a measurement system. As shown in FIG. 7, the system includes an electronic device 701 configured to read, from a hardware storage device, running code and running data that are in a running process of a VMM, generate and store first verification information according to the running code and the running data, and transmit, to a trusted data center 702, log information generated in a process that is from reading, by the electronic device 701, the running code and the running data to storing, by the electronic device 701, the first verification information, and the trusted data center 702 configured to receive the log information sent by the electronic device 701, acquire the first verification information from the electronic device 701, and measure the electronic device 701 using the first verification information and second verification information that is generated according to the log information.

The trusted data center 702 may be connected to multiple electronic devices 701, and may measure each electronic device of the multiple electronic devices 701 to determine whether a current running environment of each electronic device is secure or an access risk exists.

Further, the electronic device 701 is, for example, a desktop computer, a notebook computer, or another electronic device. The electronic device 701 is any one of the electronic devices in Embodiment 1 to Embodiment 3. Further, the hardware storage device may be a hard disk, a register, a memory, or another electronic device of the electronic device. The running data is, for example, data included in a data table, such as a hypercall table called in a running process of the running code, an exception table, an IDT, or a GDT.

In this embodiment of the present disclosure, a technical solution of the present application includes running code and running data are read from a hardware storage device, and first verification information is generated according to the running code and the running data. Then, the first verification information is stored, and log information, which is generated in a process that is from reading, by an electronic device, the running code and the running data to storing, by the electronic device, the first verification information, is transmitted to a trusted data center such that the trusted data center measures the electronic device using the first verification information acquired from the electronic device and second verification information generated according to the log information. The running code and the running data are stored in the hardware storage device, and tampering with the running code and the running data in the hardware storage device is more difficult. Therefore, security is higher, and the generated first verification information is more accurate. Further, the electronic device can be measured more accurately when the trusted data center measures the electronic device according to the second verification information and the first verification information. Because a running process of an operating system is not disrupted in the foregoing measurement process, while a running process of an operating system is disrupted in the prior art, security of the electronic device is higher in the technical solution of the present application, and the electronic device can be measured more accurately.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A measurement method, comprising:
writing, by an electronic device to a hardware storage device, running code and running data that are in a running process of a virtual machine manager (VMM), the electronic device running the VMM;
reading, by the electronic device from the hardware storage device, the running code and the running data without disrupting the running process of the VMM;
generating, by the electronic device, first verification information according to the running code and the running data using a digital digest calculation;
storing, by the electronic device, the first verification information; and
transmitting, to a trusted data center, log information comprising the running code, the running data, and a timestamp corresponding to a time at which the first verification information is generated,
the trusted data center generating second verification information according to the running code and the running data of the log information corresponding to the timestamp and using the digital digest calculation, and
the trusted data center measuring the electronic device using the first verification information and the second verification information.

2. The method according to claim 1, wherein reading, by the electronic device from the hardware storage device, the running code and the running data that are in the running process of the VMM comprises:
reading, by the electronic device from firmware complementary metal-oxide semiconductor (CMOS), storage address information and storage capacity information of the running code and the running data; and
reading, by the electronic device from the hardware storage device, the running code and the running data according to the storage address information and the storage capacity information.

3. The method according to claim 2, wherein after reading, by the electronic device from the firmware CMOS, the storage address information and the storage capacity information of the running code and the running data and before reading, from the hardware storage device, the running code and the running data according to the storage address information and the storage capacity information, the method further comprises verifying, by the electronic device, the storage address information and the storage capacity information.

4. The method according to claim 2, wherein reading, by the electronic device from the CMOS, the storage address information and the storage capacity information of the running code and the running data further comprises reading, by the electronic device from the CMOS, the storage address information and the storage capacity information in a system management mode.

5. The method according to claim 4, wherein before reading, by the electronic device from the CMOS, the storage address information and the storage capacity information in the system management mode, the method further comprises:
digitally signing, by the electronic device, the storage address information and the storage capacity information of the running code and the running data in the running process of the VMM; and
writing, into the CMOS, the storage address information and the storage capacity information that are digitally signed.

6. An electronic device, comprising:
a hardware storage device configured to store running code and running data that are in a running process of a virtual machine manager (VMM), the electronic device running the VMM;
a controller coupled to the hardware storage device and configured to:
write the running code and the running data to the hardware storage device;
read the running code and the running data from the hardware storage device without disrupting the running process of the VMM;
generate first verification information according to the running code and the running data using a digital digest calculation; and
store the first verification information; and
a transmitter coupled to the controller and configured to transmit to a trusted data center, log information comprising the running code, the running data, and a timestamp corresponding to a time at which the first verification information is generated,
the trusted data center generating second verification information according to the running code and the running data of the log information corresponding to the timestamp and using the digital digest calculation, and
the trusted data center measuring the electronic device using the first verification information and the second verification information.

7. The electronic device according to claim 6, wherein the controller is further configured to:
read storage address information and storage capacity information of the running code and the running data from firmware complementary metal-oxide semiconductor (CMOS); and
read, the running code and the running data from the hardware storage device according to the storage address information and the storage capacity information.

8. The electronic device according to claim 7, wherein the controller is further configured to verify the storage address information and the storage capacity information after the storage address information and the storage capacity information of the running code and the running data are read from the CMOS and before the running code and the running data are read from the hardware storage device according to the storage address information and the storage capacity information.

9. The electronic device according to claim 7, wherein the controller is further configured to read, from the CMOS, the storage address information and the storage capacity information in a system management mode.

10. The electronic device according to claim 9, wherein before the storage address information and the storage capacity information are read from the CMOS in the system management mode, the controller is further configured to:

digitally sign the storage address information and the storage capacity information of the running code and the running data in the running process of the VMM; and write, into the CMOS, the storage address information and the storage capacity information that are digitally signed.

11. A measurement system, comprising:
an electronic device; and
a trusted data center,
the electronic device and the trusted data center being in communication with each other,
the electronic device being configured to:
  write, to a hardware storage device, running code and running data that are in a running process of a virtual machine manager (VMM), the electronic device running the VMM;
  read, from the hardware storage device, the running code and the running data without disrupting the running process of the VMM;
  generate first verification information according to the running code and the running data using a digital digest calculation;
  store the first verification information; and
  transmit, to the trusted data center, log information comprising the running code, the running data, and a timestamp corresponding to a time at which the first verification information is generated, and
the trusted data center being configured to:
  receive the log information sent by the electronic device;
  acquire the first verification information from the electronic device; and
  measure the electronic device using the first verification information and second verification information, the second verification information being generated according to the running code and the running data of the log information corresponding to the timestamp and using the digital digest calculation.

12. A non-transitory computer readable storage medium configured to store a program code, the program code comprising an instruction used to perform a measurement method, and the measurement method comprising:
  writing, by an electronic device to a hardware storage device, running code and running data that are in a running process of a virtual machine manager (VMM), the electronic device running the VMM;
  reading, by the electronic device from the hardware storage device, the running code and the running data without disrupting the running process of the VMM;
  generating, by the electronic device, first verification information according to the running code and the running data using a digital digest calculation;
  storing, by the electronic device, the first verification information; and
  transmitting, to a trusted data center, log information comprising the running code, the running data, and a timestamp corresponding to a time at which the first verification information is generated,
  the trusted data center generating second verification information according to the running code and the running data of the log information corresponding to the timestamp and using the digital digest calculation, and
  the trusted data center measuring the electronic device using the first verification information and the second verification information.

* * * * *